United States Patent
Ukaji et al.

(10) Patent No.: US 11,929,654 B2
(45) Date of Patent: Mar. 12, 2024

(54) COIL MOUNTING STRUCTURE

(71) Applicant: Panasonic Intellectual Property Management Co., Ltd., Osaka (JP)

(72) Inventors: Hajime Ukaji, Hyogo (JP); Mitsuoki Hishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 549 days.

(21) Appl. No.: 17/285,458

(22) PCT Filed: Oct. 17, 2019

(86) PCT No.: PCT/JP2019/040950
§ 371 (c)(1),
(2) Date: Apr. 14, 2021

(87) PCT Pub. No.: WO2020/080481
PCT Pub. Date: Apr. 23, 2020

(65) Prior Publication Data
US 2021/0344246 A1    Nov. 4, 2021

(30) Foreign Application Priority Data
Oct. 18, 2018    (JP) ................. 2018-196586

(51) Int. Cl.
*H02K 3/28*     (2006.01)
*H02K 1/14*     (2006.01)
(Continued)

(52) U.S. Cl.
CPC ............... *H02K 3/28* (2013.01); *H02K 1/165* (2013.01); *H02K 3/12* (2013.01); *H02K 3/48* (2013.01); *H02K 1/148* (2013.01); *H02K 3/522* (2013.01)

(58) Field of Classification Search
CPC .......... H02K 1/148; H02K 3/28; H02K 3/522
See application file for complete search history.

(56) References Cited

U.S. PATENT DOCUMENTS

| 2012/0223600 A1* | 9/2012 | Tonogi | H02K 1/148 310/46 |
| 2013/0313938 A1* | 11/2013 | Yamada | H02K 16/02 310/156.69 |
| 2016/0248308 A1 | 8/2016 | Ogawa et al. | |

FOREIGN PATENT DOCUMENTS

| DE | 102012212637 A1 | 1/2014 |
| DE | 102012222318 A1 | 6/2014 |

(Continued)

OTHER PUBLICATIONS

Extended European Search Report issued in corresponding European Patent Application No. 9872536.8, dated Nov. 5, 2021.

(Continued)

*Primary Examiner* — Gary A Nash
(74) *Attorney, Agent, or Firm* — Rimon, P.C.

(57) ABSTRACT

Inclined surfaces are formed in areas adjacent to a tooth protruding from the inner circumferential surface of the yoke, on both sides in a motor rotation circumferential direction, and the inclined surfaces are inclined or curved toward a protruding direction of the tooth as a distance from the tooth increases in the motor rotation circumferential direction. The conductive wire includes parts extending in the motor rotation circumferential direction on both sides of the tooth in the motor rotational shaft direction in each of first to n-th turns, and bent portions bending in a thickness direction of the conductive wire are formed in the parts so as to align in a winding axis direction through the width of the conductive wire. Portions of the conductive wire on are inclined toward the protruding direction of the associated (Continued)

tooth as the distance from the bent portion increases in the motor rotation circumferential direction.

2 Claims, 7 Drawing Sheets

(51) Int. Cl.
*H02K 1/16* (2006.01)
*H02K 3/12* (2006.01)
*H02K 3/48* (2006.01)
*H02K 3/52* (2006.01)

(56) References Cited

FOREIGN PATENT DOCUMENTS

| | | |
|---|---|---|
| JP | S53079201 A | 7/1978 |
| JP | 2005-186092 A | 7/2005 |
| JP | 2006-014530 A | 1/2006 |
| JP | 2006-14530 A | 1/2006 |
| JP | 2015-042113 A | 3/2015 |
| JP | 2015-42113 A | 3/2015 |

OTHER PUBLICATIONS

International Search Report issued in corresponding International Patent Application No. PCT/JP2019/040950, dated Dec. 17, 2019, with English translation.

* cited by examiner

COIL MOUNTING STRUCTURE

CROSS-REFERENCE OF RELATED APPLICATIONS

This application is the U.S. National Phase under 35 U.S.C. § 371 of International Patent Application No. PCT/JP2019/040950, filed on Oct. 17, 2019, which in turn claims the benefit of Japanese Application No. 2018-196586, filed on Oct. 18, 2018, the entire disclosures of which Applications are incorporated by reference herein.

TECHNICAL FIELD

The present invention relates to a coil mounting structure including a tooth in a columnar shape protruding from an inner circumferential surface of a yoke in an annular shape of a stator of a motor, and a coil mounted on the tooth, the coil having first to n-th turns (n is an integer of 2 or more) formed by stacking, in a winding axis direction, a plate-shaped conductive wire extending in a shape of a strip and being bent in a width direction, while winding the plate-shaped conductive wire.

BACKGROUND ART

Patent Document 1 discloses a coil having first to n-th turns (n is an integer of 2 or more) formed by stacking, in a winding axis direction, a plate-shaped conductive wire extending in a shape of a strip and being bent in the width direction, while winding the plate-shaped conductive wire. The conductive wire constituting each turn of the coil is substantially flat.

CITATION LIST

Patent Document

Patent Document 1: German Patent Application Publication No. 102012212637

SUMMARY OF THE INVENTION

Technical Problem

If a coil such as that disclosed in Patent Document 1 is mounted on the tooth in a columnar shape protruding from an inner circumferential surface of a yoke in an annular shape of a stator of a motor, adjacent areas adjacent to the tooth protruding from an inner circumferential surface of the yoke, on both sides in a motor rotation circumferential direction may be made flat perpendicular to the protruding direction of the tooth. In such a case, the thickness of the yoke in a motor radial direction gradually decreases as the distance from the tooth protruding increases in the motor rotation circumferential direction because the outer circumferential surface of the yoke is usually curved so as to form a circular shape in a plan view. Therefore, in order to make the thickness of the entire yoke in the motor radial direction be equal to or greater than the minimum thickness necessary for preventing magnetic saturation, the thickness of the yoke in the motor radial direction at each of the ends of the adjacent areas adjacent to the tooth protruding is required to be greater than the minimum thickness. Thus, it has been impossible to downsize the motor.

In view of the foregoing background, it is therefore an object of the present invention to downsize the motor.

Solution to the Problem

In order to achieve the above objective, the technique disclosed herein provides a coil mounting structure including a tooth in a columnar shape protruding from an inner circumferential surface of a yoke in an annular shape of a stator of a motor, and a coil mounted on the tooth, the coil having first to n-th turns (n is an integer of 2 or more) formed by stacking, in a winding axis direction, a plate-shaped conductive wire extending in a shape of a strip and being bent in a width direction, while winding the plate-shaped conductive wire. Inclined surfaces are formed in respective adjacent areas adjacent to the tooth protruding from the inner circumferential surface of the yoke, on both sides in a motor rotation circumferential direction. The inclined surfaces are inclined or curved toward a protruding direction of the tooth as a distance from the tooth protruding increases in the motor rotation circumferential direction. The conductive wire includes parts extending in the motor rotation circumferential direction on both sides of the tooth in a motor rotational shaft direction in each of the first to n-th turns of the coil, and respective bent portions bent in a thickness direction of the conductive wire are formed in the parts, so as to be aligned in a winding axis direction through the entire width of the conductive wire. The portions of the conductive wire on both sides of each of the bent portions in the motor rotation circumferential direction in each of the first to n-th turns of the coil are inclined toward the protruding direction of the associated tooth as the distance from the bent portion increases in the motor rotation circumferential direction.

Advantages of the Invention

In the present disclosure, the inclined surfaces are formed in the respective adjacent areas adjacent to the tooth protruding from the inner circumferential surface of the yoke, on both sides in the motor rotation circumferential direction. Thus, at the ends of the adjacent areas near the tooth protruding, the thickness of the yoke in the motor radial direction can be set to a value that is close to the minimum thickness necessary for preventing magnetic saturation, as compared to the case in which the adjacent areas are made flat perpendicular to the protruding direction of the tooth. Therefore, the present disclosure achieves downsizing of the motor.

DESCRIPTION OF EMBODIMENT

An embodiment of the present invention will be described below with reference to the drawings.

Figure 1A:
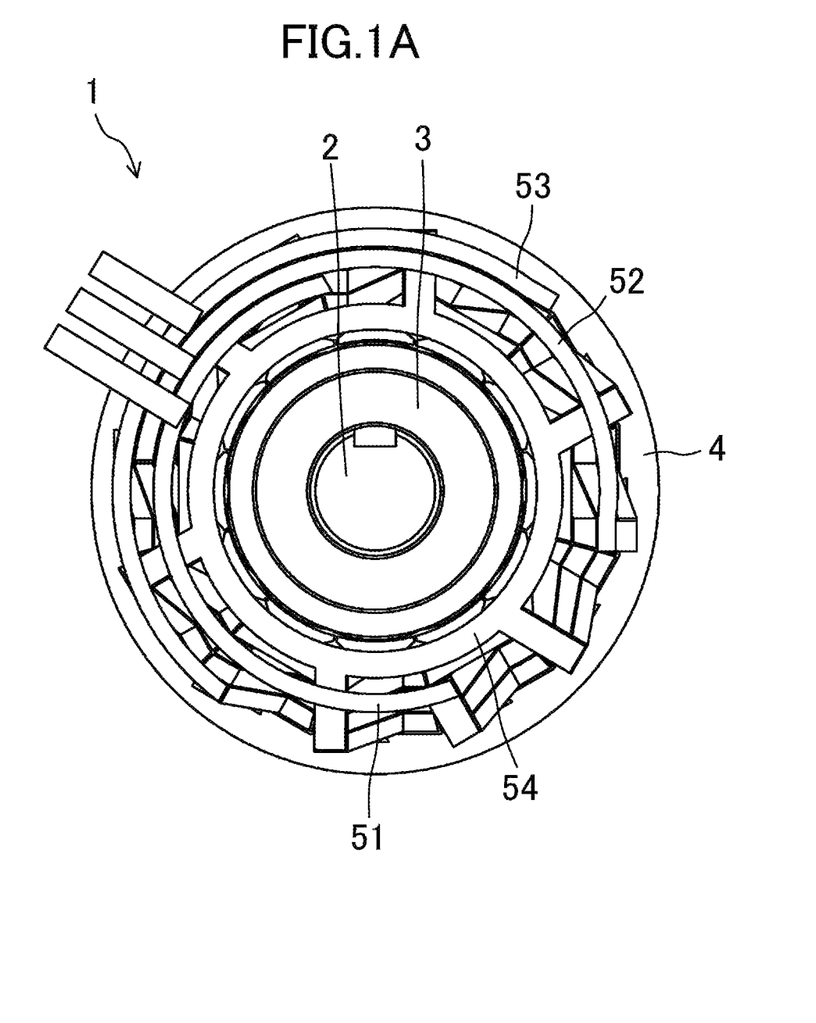
FIG. 1A is a plan view of a motor having a coil mounting structure according to an embodiment applied.
Figure 1B:
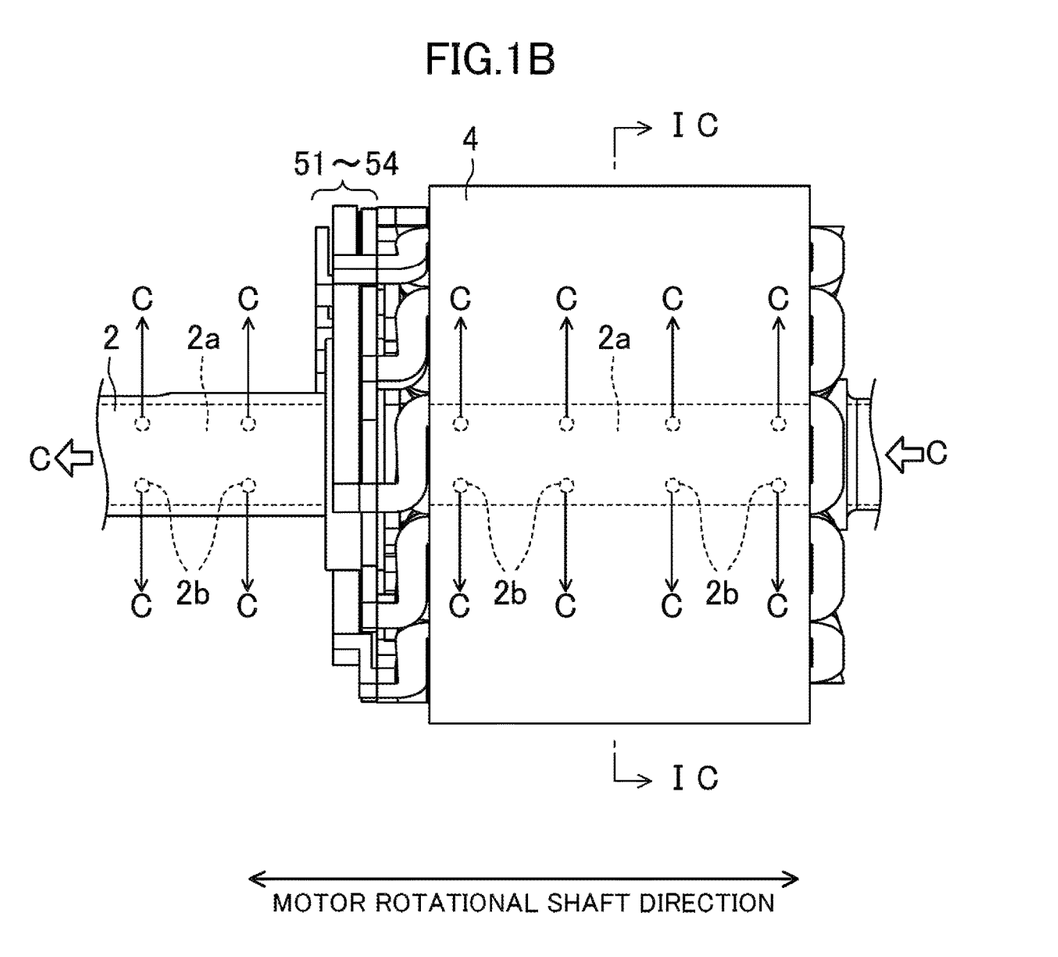
FIG. 1B is a side view of the motor having the coil mounting structure according to the embodiment applied.
Figure 1C:
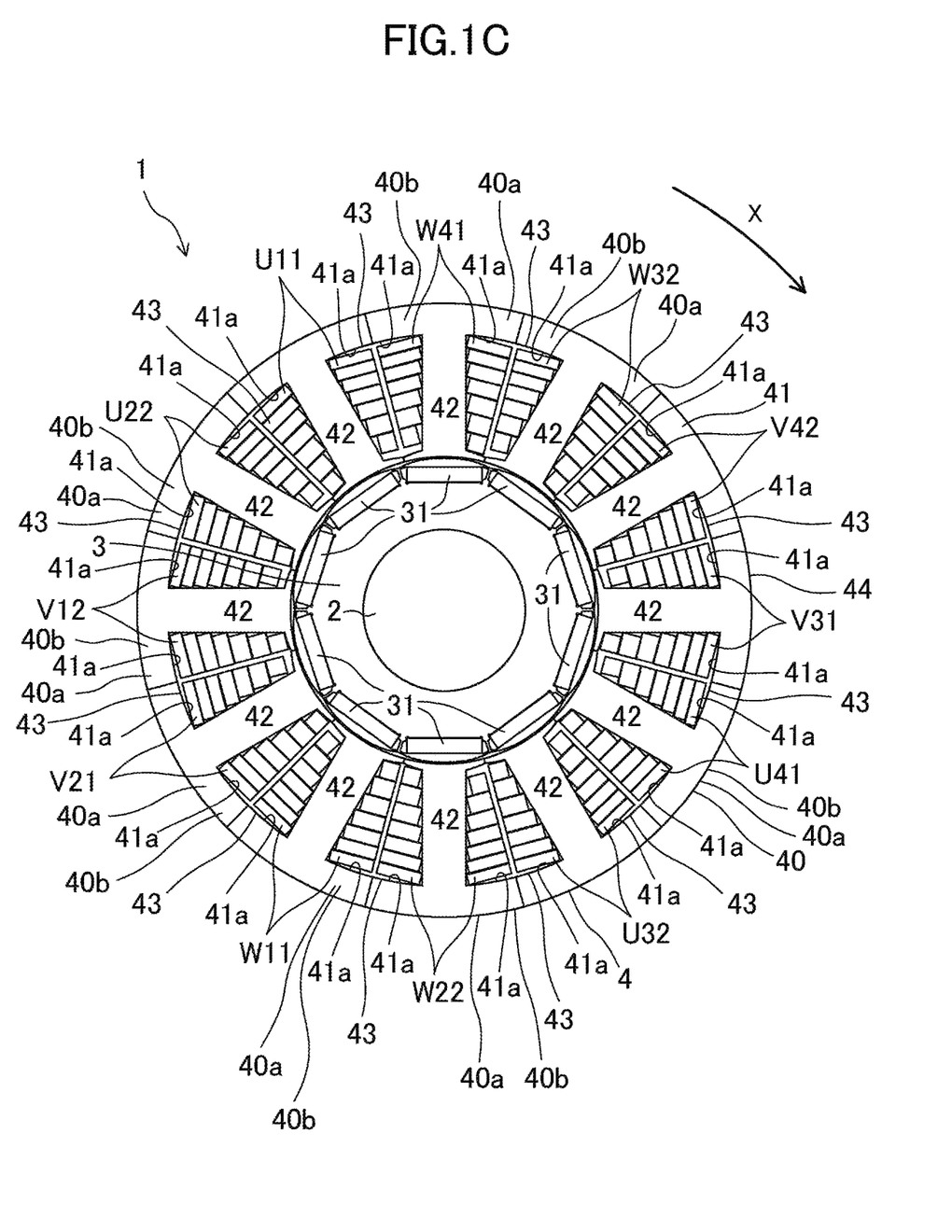
FIG. 1C is a cross-sectional view taken along line IC-IC in FIG. 1B.
Figure 2:
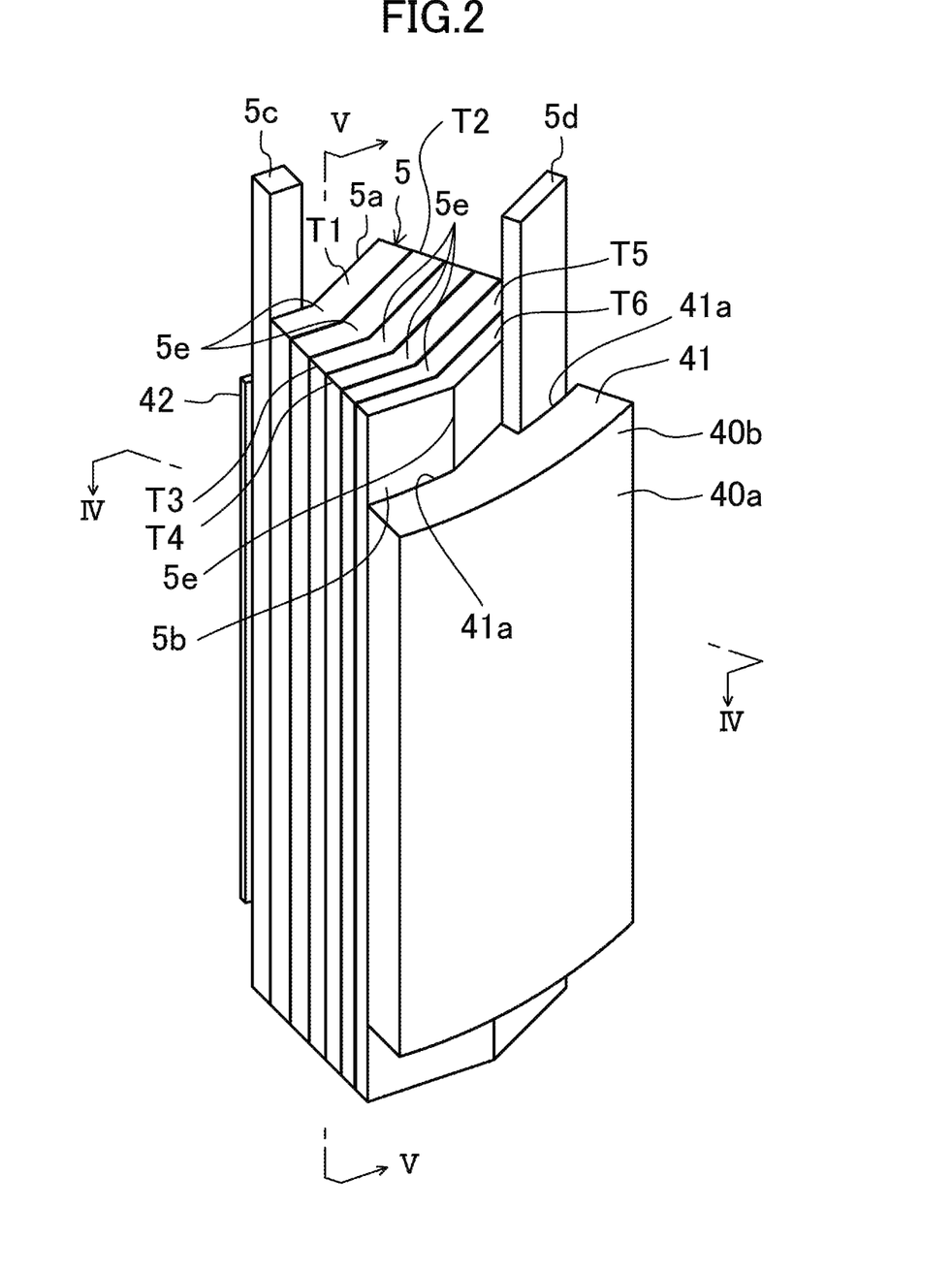
FIG. 2 is a perspective view showing a state in which a coil is mounted on a divided core.
Figure 3:
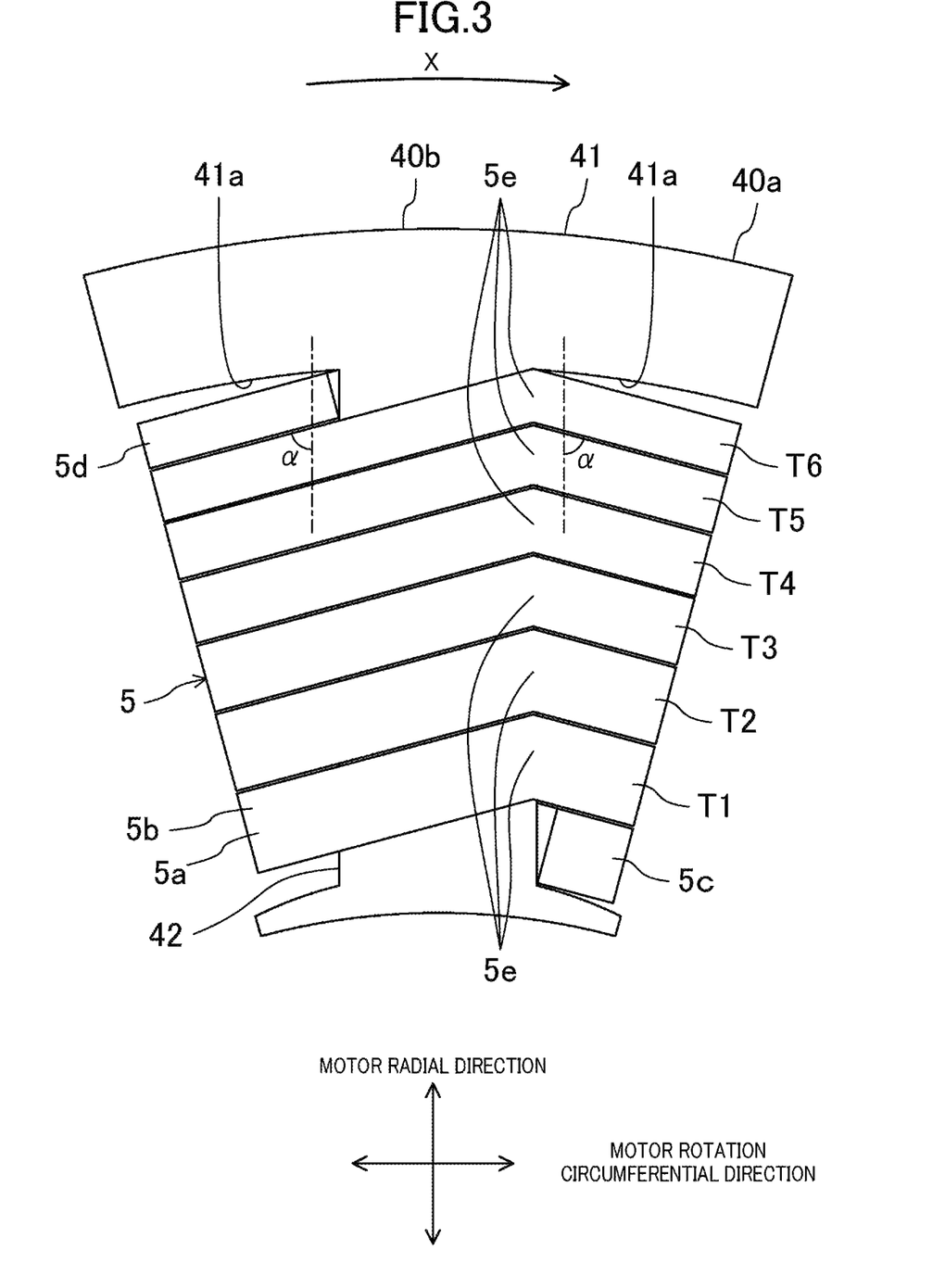
FIG. 3 is a plan view of FIG. 2.

FIGS. 1A to 1C are a top view, a side view, and a cross-sectional view of a motor 1, respectively. However, none of the drawings illustrates a cover case and the like. The motor 1 includes a shaft 2, a rotor 3, a stator 4, coils U11 to W41, and bus bars 51 to 54, inside the cover case (not shown).

Note that the direction perpendicular to each of the planes in FIGS. 1A and 1C is a motor rotational shaft direction.

Further, term "integral" or "integration" refers not only to a state in which a plurality of components are mechanically connected to each other by bolting, caulking, or the like, but also to a state of one object in which components are electrically connected by material bonding such as covalent bonding, ionic bonding, or metallic bonding, and a state of one object in which all components are electrically connected to each other by material bonding such as melting.

The shaft 2 has a hollow portion 2a extending in the motor rotational shaft direction, and a side surface having a plurality of through holes 2b. The hollow portion 2a is a passage which allows a refrigerant C to pass therethrough to cool the inside of the motor 1. The refrigerant C flows through the hollow portion 2a in the motor rotational shaft direction (the longitudinal direction of the shaft 2) and circulates inside the motor 1. Further, part of the refrigerant C flowing through the hollow portion 2a flows out from the plurality of through holes 2b and flows from a center portion of the motor 1 toward its outside, that is, from the rotor 3 toward the stator 4, thereby cooling the rotor 3 and the stator 4.

The rotor 3 is in contact with the outer circumference of the shaft 2, and includes magnets 31, 31, . . . facing the stator 4, with N and S poles arranged alternately along the outer circumference of the shaft 2. The magnets 31 used in the rotor 3 are neodymium magnets in the present embodiment. However, the materials, shapes, and characteristics of the magnets may be changed as appropriate in accordance with the output of the motor 1, for example.

The stator 4 includes a stator core 40 comprised of twelve (a plurality of) divided cores 40a shown in FIGS. 2 to 5. The divided cores 40a include respective plate-shaped divided yokes 40b that are curved in an arc shape centered at the rotational shaft of the motor 1. Teeth 42 protruding from the respective inner circumferential surfaces of the divided yokes 40b are arranged entirely in the motor rotational shaft direction so as to face the rotation center of the motor 1. Hereinafter, of two directions perpendicular to the protruding direction of the teeth 42, a direction perpendicular to the motor rotational shaft direction will be referred to as a motor rotation circumferential direction. A portion of each of the teeth 42 excluding an end portion is in a columnar shape extending to have a quadrangular cross section. The end portion of the tooth 42 overhangs toward both sides in the motor rotation circumferential direction. The portion of each of the teeth 42 excluding the end portion has a pair of surfaces, which constitute the outer circumferential surface of the tooth 42, facing in the motor rotational shaft direction, and a remaining pair of surfaces facing in the motor rotation circumferential direction. The divided cores 40a are coupled to each other by fitting a ring-shaped holding member 44 onto the outer circumferential surfaces of the divided yokes 40b. The divided yokes 40b of the plurality of divided cores 40a constitute a substantially annular yoke 41. Therefore, the teeth 42 are arranged at equal intervals in the inner circumferential surface of the yoke 41. The outer circumferential surface of the yoke 41 is curved so as to form a circular shape in a plan view, and areas of the inner circumferential surface of the yoke 41 excluding the teeth 42 protruding are curved so as to form a circular shape that is concentric with the outer circumferential surface of the yoke 41 in a plan view. Therefore, inclined surfaces 41a are formed in respective adjacent areas adjacent to an associated tooth 42 protruding from the inner circumferential surface of the yoke 41, on both sides in the motor rotation circumferential direction, and the inclined surfaces 41a are inclined or curved toward the protruding direction of the tooth 42 as the distance from the tooth 42 protruding increases in the motor rotation circumferential direction. Slots 43, 43, . . . are provided between the teeth 42, 42, . . . . The stator 4 is disposed on an outer side of the rotor 3 at a fixed distance from the rotor 3 when viewed from the motor rotational shaft direction.

Each of the teeth 42 of the stator core 40 is formed from a laminate obtained by stacking a plurality of core sheets made from electromagnetic steel sheets containing, for example, silicon, in the motor rotational shaft direction (direction orthogonal to the extending direction of the tooth 42).

In the present embodiment, the number of magnetic poles of the rotor 3 is ten in total: five N poles and five S poles facing the stator 4, whereas the number of slots 43 is twelve. The numbers are not limited thereto and other number combinations of the magnetic poles and slots are also applicable.

The stator 4 includes twelve coils U11 to W41, which are mounted on the respective teeth 42, 42, . . . by applying the mounting structure of the present embodiment, and disposed in the respective slots 43, 43, . . . as viewed from the motor rotational shaft direction. That is, the coils U11 to W41 are wound on the respective teeth 42, 42, . . . by concentrated winding. Further, the coils U11 to U41 are being integrated with the bus bar 51, the coils V12 to V42 are being integrated with the bus bar 52, and the coils W11 to W41 are being integrated with the bus bar 53.

Here, each of the coils is represented by reference characters UXY, VXY, or WXY. In these reference characters, the first character represents a phase (U-phase, V-phase, and W-phase in the present embodiment) of the motor 1, and the second character represents the order in which coils in the same phase are arranged. The third character represents the winding direction of the coil. In the present embodiment, 1 represents a clockwise direction and 2 represents a counterclockwise direction. Therefore, the coil U11 is a coil in the U-phase of the first order and wound clockwise. The coil V42 is a coil in the V-phase of the fourth order and wound counterclockwise. The term "clockwise" refers to the rotation to the right as viewed from the center of the motor 1. The term "counterclockwise" refers to the rotation to the left as viewed from the center of the motor 1.

Strictly speaking, the coils U11 and U41 are U-phase coils, and the coils U22 and U32 are U-bar phase coils (the direction of the generated magnetic field is opposite to that of the U-phase coils), but in the following description, they are collectively referred to as U-phase coils unless otherwise specified. Similarly, the coils V12 to V42 and the coils W11 to W41 are collectively referred to as V-phase coils and W-phase coils, respectively. Hereinafter, each of the coils U11 to W41 will be referred to as a coil 5.

The coil 5 includes a conductive wire 5a wound, an insulating coating 5b provided on the surface of the conductive wire 5a, a lead-out portion 5c led out from a first turn T1 (described later) of the conductive wire 5a, and a lead-out portion 5d led out from a sixth turn T6 (described later).

The conductive wire 5a forms a series of turns including the first to sixth turns T1 to T6 formed by stacking, in a winding axis direction, a plate-shaped conductive wire having a quadrangular cross section, extending in a shape of a strip, and being bent in the width direction, while winding the conductive wire in a single layer by six turns. Note that a portion wound from the end of the lead-out portion 5c to a position below the lead-out portion 5d is defined as the first turn T1. In the subsequent turns, each portion wound by one turn is defined as the second turn T2 to the sixth turn T6, in order. Further, a starting point of each of the first to sixth turns T1 to T6 can be defined as appropriate. The first to sixth turns T1 to T6 gradually increase in thickness toward the protruding direction of the tooth 42. The conductive wire 5a includes parts extending in the motor rotation circumferential direction on both sides of the tooth in the motor rotational shaft direction in each of the first to sixth turns T1 to T6, and in the vicinity of the side ends (corners) of the parts in the clockwise direction in FIG. 1C (direction indicated by each arrow X in FIGS. 1C and 3), respective bent portions 5e bent in the thickness direction of the conductive wire 5a are formed so as to be aligned in a winding axis direction through the entire width of the conductive wire 5a, and portions of the conductive wire 5a on both sides of each of the bent portions 5e in the motor rotation circumferential direction are inclined toward the protruding direction of the associated tooth 42 as the distance from the bent portion 5e increases in the motor rotation circumferential direction. An angle α of each of the portions of the conductive wire 5a on both sides of each of the bent portions 5e in the motor circumferential direction, relative to the protruding direction of the tooth 42 is an acute angle. Therefore, the portions of the conductive wire 5a, on both sides of each of the bent portions 5e in the motor circumferential direction extends along the respective inclined surfaces 41a of the yoke 41. The conductive wire 5a is formed of, for example, copper, aluminum, zinc, magnesium, brass, iron, SUS, or the like. The conductive wire 5a can be manufactured by, for example, punching out each half-turn of the conductive wire 5a from a sheet metal and joining the punched-out wires together by welding or the like.

The insulating coating 5b is provided on the entire surface of the conductive wire 5a, except for the lead-out portions 5c and 5d of the conductive wire 5a, so as to insulate the coil 5 from external members (not shown). For example, in the motor 1 shown in FIGS. 1A to 1C, the coil 5 and the stator core 40 are insulated from each other by the insulating coating 5b and an insulating member (not shown) such as a resin or insulating paper. Further, adjacent turns in the coil 5 are insulated from each other by the insulating coating 5b. The insulating coating 5b is formed from, for example, polyimide, nylon, PEEK, acryl, amide-imide, ester-imide, enamel, or heat-resistant resin. The insulating coating 5b is about several tens of micrometers thick, for example, between 10 μm and 50 μm.

Each of lead-out portions 5c and 5d is a portion of the conductive wire 5a. To receive current supplied from the outside or to supply the current to the outside, the lead-out portions 5c and 5d extend from the side surface of the coil 5, in other words, a plane intersecting with the series of turns of the conductive wire 5a. Further, in order to connect the lead-out portions 5c and 5d to an external member, for example, any one of the bus bars 51 to 54 shown in FIGS. 1A and 1B, the insulating coating 5b is removed at the lead-out portion 5c and 5d. Note that the insulating coating 5b does not have to be removed from the entire area of the lead-out portion 5c and 5d. The insulating coating 5b may be removed only from portions necessary to be connected with the bus bars 51 to 54, for example.

Therefore, in the present embodiment, inclined surfaces 41a are formed in the respective adjacent areas that are adjacent to the tooth 42 protruding from the inner circumferential surface of the yoke 41, on both sides in the motor rotation circumferential direction. Thus, at the ends of the adjacent areas near the tooth 42 protruding, the thickness of the yoke 41 in the motor radial direction can be set to a value that is close to the minimum thickness necessary for preventing magnetic saturation, as compared to the case in which the adjacent areas are made flat perpendicular to the protruding direction of the tooth 42. Therefore, the motor 1 can be downsized.

Further, portions of the conductive wire 5a on both sides of each of the bent portions 5e in the motor rotation circumferential direction in each of the first to sixth turns T1 to T6 turns of the coil 5 are inclined toward the protruding direction of the associated tooth 42 as the distance from the bent portion 5e increases in the motor rotation circumferential direction. Thus, an area of the plate surface of the conductive wire 5a in each of the turns T1 to T6 can be increased without increasing the dimension of the coil 5 in the motor rotation circumferential direction, as compared to the case in which the coil 5 is arranged such that the plate surface of conductive wire 5a in each of the turns T1 to T6 is perpendicular to the protruding direction of the tooth 42.

Further, portions of the conductive wire 5a on both sides of each of the bent portions 5e in the motor rotation circumferential direction in each of the first to sixth turns T1 to T6 turns of the coil 5 are inclined toward the protruding direction of the associated tooth 42 as the distance from the bent portion 5e increases in the motor rotation circumferential direction. Thus, a dead space formed between the inner circumferential surface of the yoke 41 and the coil 5 can be narrowed, as compared to the case in which the coil 5 is arranged such that the plate surface of conductive wire 5a in each of the turns T1 to T6 is perpendicular to the protruding direction of the tooth 42. Therefore, efficiency of heat dissipation of the coil 5 can be increased, the space factor of the coil 5 inside the stator 4 can be improved, and efficiency of the motor 1 can be increased.

Further, since the dead space formed between the inner circumferential surface of the yoke 41 and the coil 5 is reduced, the sizes of the coil 5 and the teeth 42 in the protruding direction of the teeth 42 can be reduced, which enables downsizing of the motor 1 in the radial direction.

Figure 4:
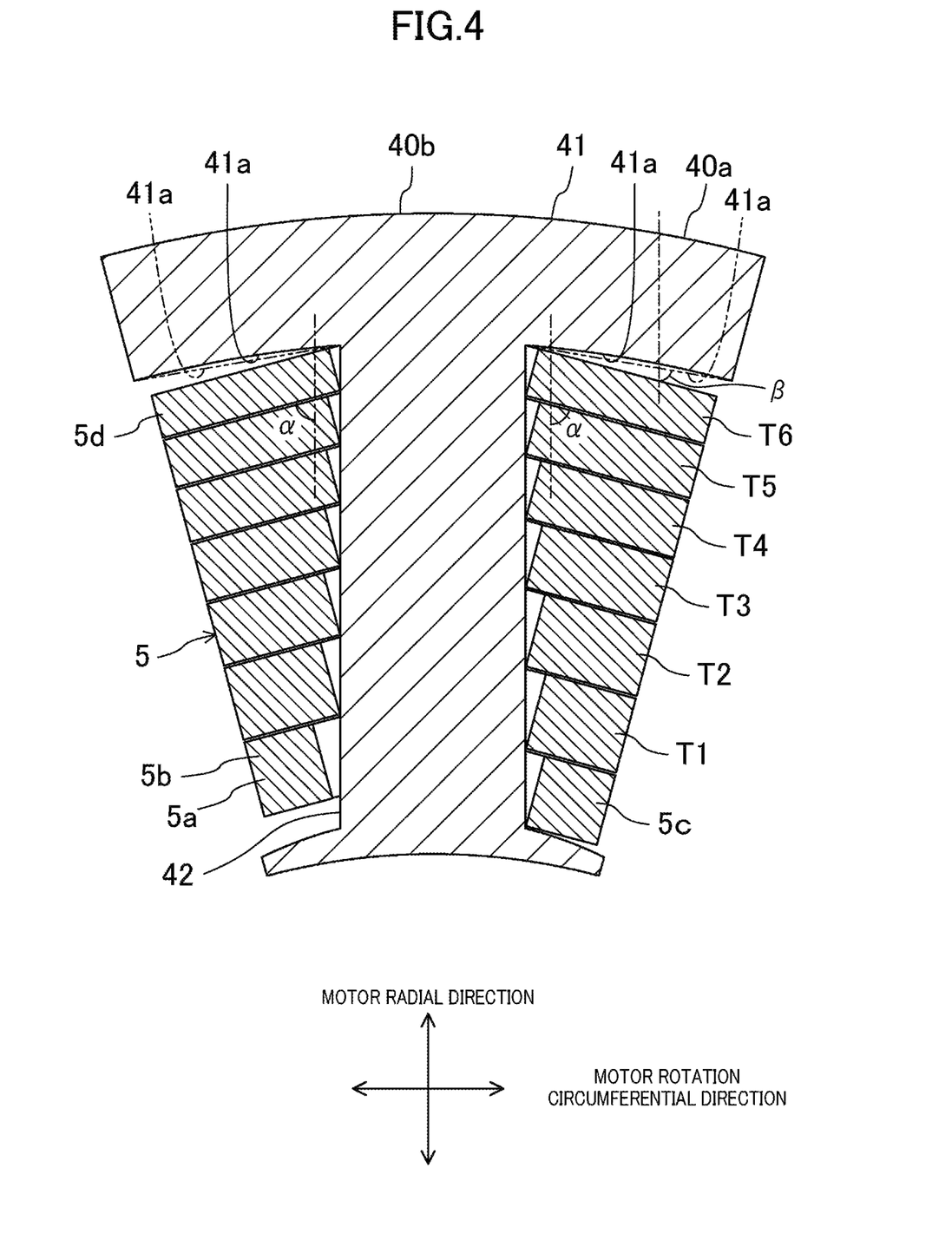
FIG. 4 is a cross-sectional view taken along line IV-IV in FIG. 2.
Figure 5:
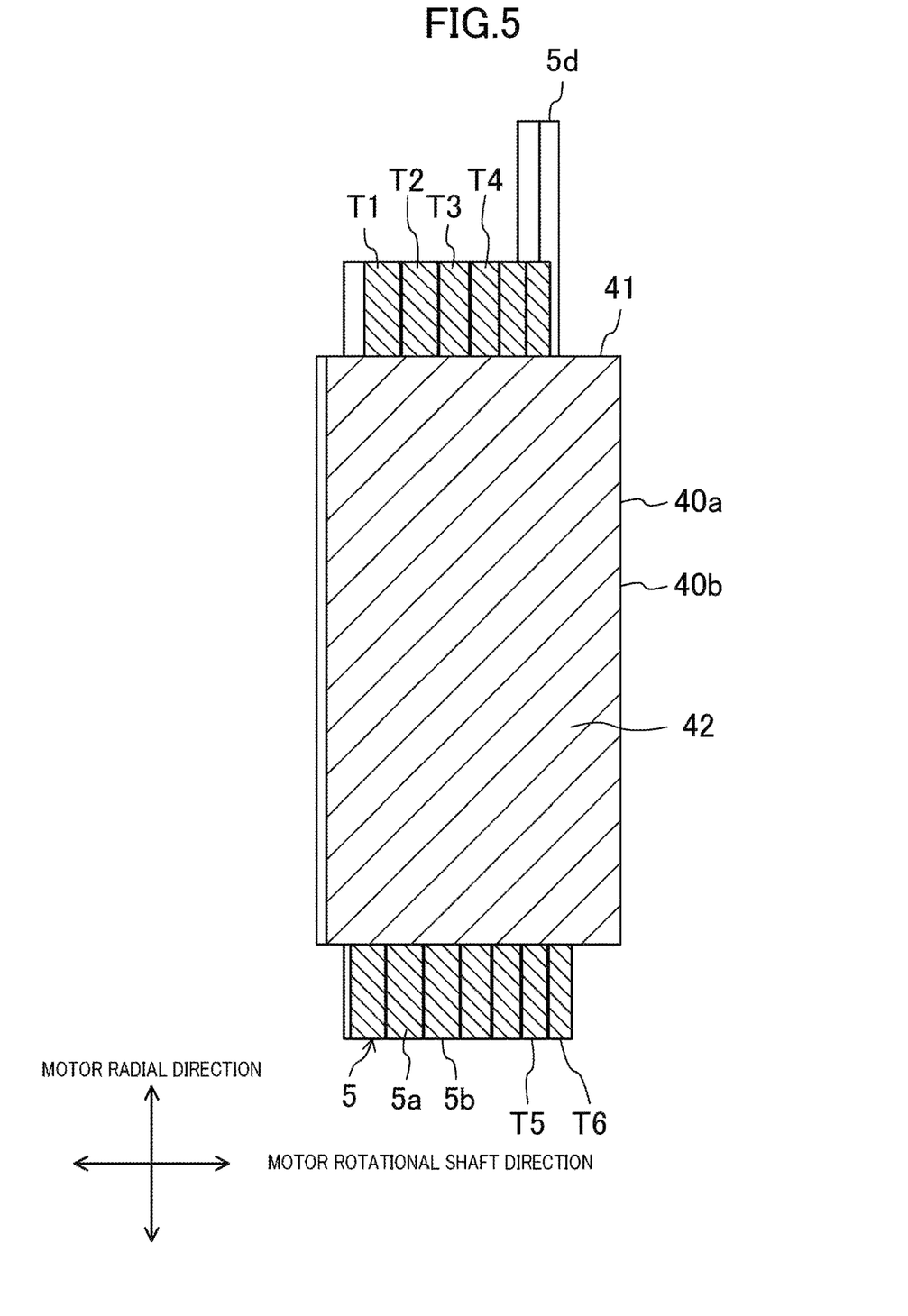
FIG. 5 is a cross-sectional view taken along the line V-V in FIG. 2.

In the above embodiment, the inclined surfaces 41a of the yoke 41 are curved surfaces curved toward the protruding direction of the tooth 42 as the distance from the tooth 42 protruding increases in the motor rotation circumferential direction, but may be flat surfaces inclined without curing, as indicated by the phantom line in FIG. 4. In this case, an angle β of each of the inclined surfaces 41a, relative to the protruding direction of the tooth 42 is an acute angle.

In addition, in the above embodiment, the number of turns (n) of the coil 5 is six, but may be a numerical number other than six (integer) as long as the number is (n) is two or more.

In addition, in the above embodiment, the conductive wire 5a of the coil 5 is comprised of wire material having a quadrangular cross section, but may be comprised of a wire material having a trapezoidal or rhombic cross section.

The coil mounting structure of the present disclosure allows a motor to be downsized and is thus useful for applications to a motor, a power device, and the like.

DESCRIPTION OF REFERENCE CHARACTERS

1 Motor
4 Stator

41 Yoke
41a Inclined Face
42 Tooth
5 Coil
5a Conductive Wire
5e Bent portion
T1 to T6 Turn

The invention claimed is:

1. A coil mounting structure comprising:
a tooth in a columnar shape protruding from an inner circumferential surface of a yoke in a ring shape of a stator of a motor, and
a coil mounted on the tooth, the coil having first to n-th turns (n is an integer of 2 or more) formed by stacking, in a winding axis direction, a plate-shaped conductive wire extending in a shape of a strip and being bent in a width direction, while winding the plate-shaped conductive wire, wherein
inclined surfaces are formed in respective adjacent areas adjacent to the tooth protruding from the inner circumferential surface of the yoke, on both sides in a motor rotation circumferential direction, the inclined surfaces being inclined or curved toward a protruding direction of the tooth as a distance from the tooth protruding increases in the motor rotation circumferential direction,
the conductive wire includes parts extending in the motor rotation circumferential direction on both sides of the tooth in a motor rotational shaft direction in each of the first to n-th turns of the coil, and respective bent portions bent in a thickness direction of the conductive wire are formed in the parts so as to be aligned in a winding axis direction through the entire width of the conductive wire, and
portions of the conductive wire on both sides of each of the bent portions in the motor rotation circumferential direction in each of the first to n-th turns of the coil are inclined toward the protruding direction of the tooth as the distance from the bent portion increases in the motor rotation circumferential direction.

2. The coil mounting structure of claim 1, wherein
the first to n-th turns of the coil gradually increase in thickness toward the protruding direction of the tooth.

* * * * *